US006912836B2

(12) United States Patent
Hsu

(10) Patent No.: US 6,912,836 B2
(45) Date of Patent: Jul. 5, 2005

(54) HANGING CHAIN STRUCTURE FOR PENDENT LAMP

(75) Inventor: Kevin Hsu, Taichung (TW)

(73) Assignee: Dong Guan Bright Yinhuey Lighting Co., Ltd. China, Guang Dong (CN)

( * ) Notice: Subject to any disclaimer, the term of this patent is extended or adjusted under 35 U.S.C. 154(b) by 0 days.

(21) Appl. No.: 10/726,211

(22) Filed: Dec. 1, 2003

(65) Prior Publication Data

US 2005/0115219 A1    Jun. 2, 2005

(51) Int. Cl.[7] .................... A44B 13/02; E05B 37/02
(52) U.S. Cl. ......................... 59/85; 59/86; 24/598.1; 24/600.1
(58) Field of Search ............... 59/85, 86; 24/598.1, 24/599.1, 600.1

(56) References Cited

U.S. PATENT DOCUMENTS

| | | | | |
|---|---|---|---|---|
| 4,095,316 A | * | 6/1978 | Gabriel ...................... 24/599.1 |
| 4,333,212 A | * | 6/1982 | Bibollet ...................... 24/599.6 |
| 4,802,264 A | * | 2/1989 | Isenhart ...................... 24/587.1 |
| 4,811,467 A | * | 3/1989 | Lowe ......................... 24/592.1 |
| 4,835,823 A | * | 6/1989 | Contat ........................ 24/588.1 |
| 6,227,015 B1 | * | 5/2001 | Luquire ...................... 24/598.1 |
| 2003/0106190 A1 | * | 6/2003 | Christianson ............... 24/600.1 |

* cited by examiner

*Primary Examiner*—David Jones
(74) *Attorney, Agent, or Firm*—Alan D. Kamrath; Nikolai & Mersereau, P.A.

(57) ABSTRACT

A hanging chain structure for a pendent lamp includes a plurality of hanging rings connected with each other. Each of the hanging rings includes a hook body, and a stop member pivotally mounted on the hook body. Thus, the hanging rings are connected with each other easily and rapidly, so that the hanging chain structure is assembled easily and rapidly, thereby facilitating the operator mounting the hanging chain structure. In addition, the hanging chain structure is combined with the pendent lamp and the ceiling easily and rapidly, thereby facilitating the operator mounting the pendent lamp to the ceiling.

6 Claims, 6 Drawing Sheets

HANGING CHAIN STRUCTURE FOR PENDENT LAMP

BACKGROUND OF THE INVENTION

1. Field of the Invention

The present invention relates to a hanging chain structure for a pendent lamp, and more particularly to a hanging chain structure which is combined with the pendent lamp easily and rapidly, thereby facilitating the operator mounting the pendent lamp.

2. Description of the Related Art

A conventional hanging chain structure 2 in accordance with the prior art shown in FIGS. 7 and 8 is mounted between a ceiling 1 and a pendent lamp 3 and comprises a plurality of hanging rings 21 connected with each other. The ceiling 1 is provided with a fixing hook 11 locked on the uppermost one of the hanging rings 21, and the pendent lamp 3 is provided with a fixing hook 31 locked on the lowermost one of the hanging rings 21.

However, the hanging rings 21 are not connected easily and rapidly, so that the conventional hanging chain structure is not assembled easily and rapidly, thereby causing inconvenience to the operator when mounting the hanging chain structure. In addition, the conventional hanging chain structure 2 is not combined with the pendent lamp 3 and the ceiling 1 easily and rapidly, thereby causing inconvenience to the operator when mounting the pendent lamp 3 to the ceiling 1. Further, the hanging rings 21 are not connected with each other rigidly and stably, thereby easily affecting connection between the conventional hanging chain structure 2 and the pendent lamp 3.

SUMMARY OF THE INVENTION

The primary objective of the present invention is to provide a hanging chain structure which is combined with the pendent lamp and the ceiling easily and rapidly, thereby facilitating the operator mounting the pendent lamp to the ceiling.

Another objective of the present invention is to provide a hanging chain structure, wherein the hanging rings are connected rapidly, so that the hanging chain structure is assembled easily and rapidly, thereby facilitating the operator mounting the hanging chain structure.

A further objective of the present invention is to provide a hanging chain structure, wherein the hanging rings are connected with each other rigidly and stably without detachment.

In accordance with the present invention, there is provided a hanging chain structure, comprising a plurality of hanging rings connected with each other, each of the hanging rings including a hook body, and a stop member pivotally mounted on the hook body, wherein:

the hook body of each of the hanging rings has a first end formed with a pivot seat and a second end formed with a locking block, the locking block of the hook body is formed with a locking recess; and the stop member of each of the hanging rings has a first end pivotally mounted on the pivot seat of the hook body and a second end provided with a retaining pin inserted into and locked in the locking recess of the locking block of the hook body.

Further benefits and advantages of the present invention will become apparent after a careful reading of the detailed description with appropriate reference to the accompanying drawings.

DETAILED DESCRIPTION OF THE INVENTION

Figure 1:
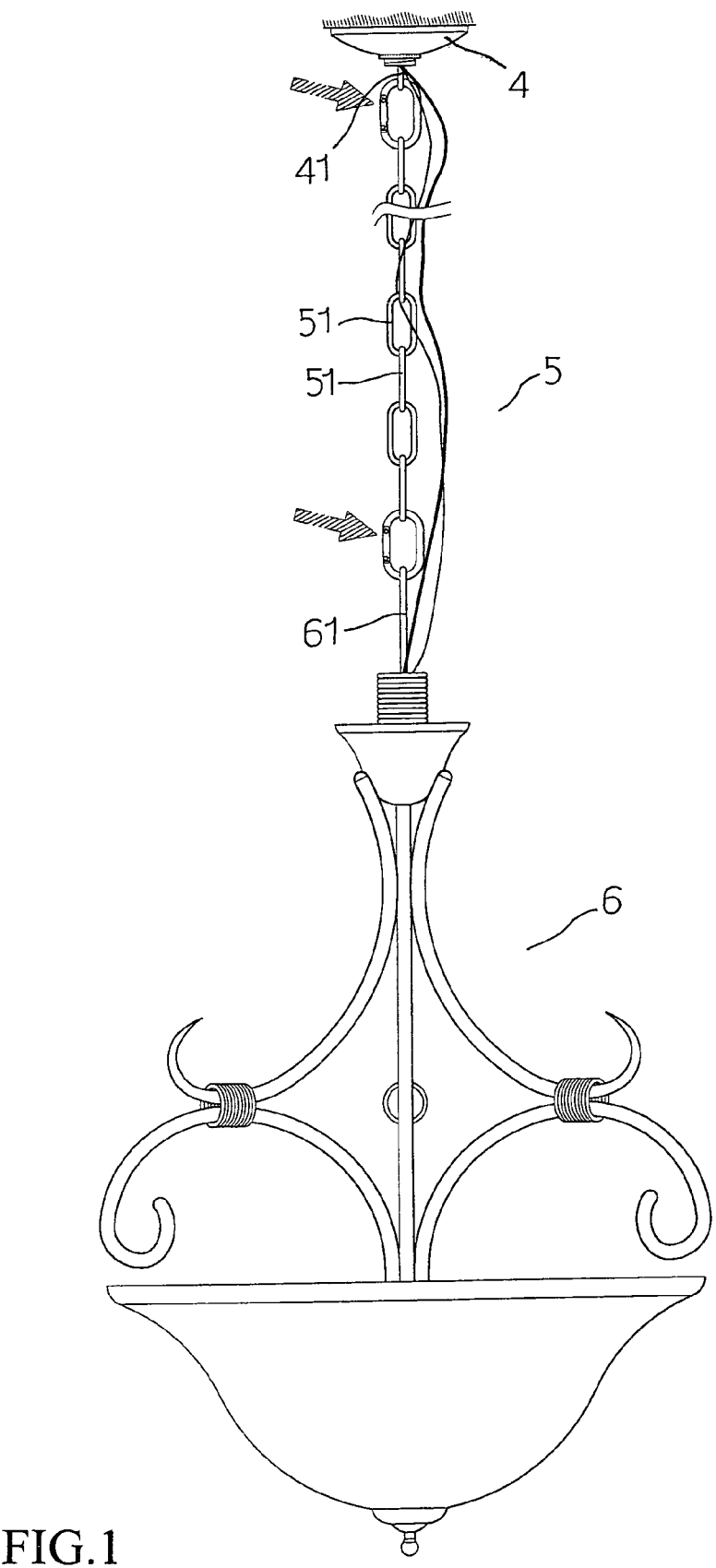
FIG. 1 is a plan view of a hanging chain structure in accordance with the preferred embodiment of the present invention.

Referring to the drawings and initially to FIGS. 1–4, a hanging chain structure 5 in accordance with the preferred embodiment of the present invention is mounted between a ceiling 4 and a pendent lamp 6 and comprises a plurality of hanging rings 51 connected with each other.

The ceiling 4 is provided with a fixing hook 41 locked on the uppermost one of the hanging rings 51, and the pendent lamp 6 is provided with a fixing hook 61 locked on the lowermost one of the hanging rings 51.

Each of the hanging rings 51 of the hanging chain structure 5 includes a hook body 511, and a stop member 512 pivotally mounted on the hook body 511. The hook body 511 of each of the hanging rings 51 is substantially C-shaped, and has a first end formed with a pivot seat 5113 and a second end formed with a locking block 5111. The locking block 5111 of the hook body 511 is formed with a locking recess 5112. The pivot seat 5113 of the hook body 511 is formed with a pivot hole 5114 and has a periphery formed with a limiting notch 5115.

The stop member 512 of each of the hanging rings 51 is substantially rod-shaped, and has a first end pivotally mounted on the pivot seat 5113 of the hook body 511 and a second end provided with a retaining pin 51260 inserted into and locked in the locking recess 5112 of the locking block 5111 of the hook body 511.

The first end of the stop member 512 is formed with a passage hole 5123 aligning with the pivot hole 5114 of the pivot seat 5113. Each of the hanging rings 51 of the hanging chain structure 5 further includes a pivot pin 5122 extended through the passage hole 5123 of the stop member 512 and the pivot hole 5114 of the pivot seat 5113, so that the first end of the stop member 512 is pivotally mounted on the pivot seat 5113 of the hook body 511. The first end of the stop member 512 is formed with a receiving recess 5121 for receiving the pivot seat 5113 of the hook body 511.

The second end of the stop member 512 is formed with a passage hole 5129 for passage of the retaining pin 51260. The second end of the stop member 512 is formed with a receiving recess 5127 for receiving the locking block 5111 of the hook body 511 when the retaining pin 51260 is inserted into the locking recess 5112 of the locking block 5111.

The stop member 512 of each of the hanging rings 51 has an inside formed with a receiving chamber 5124. Each of the hanging rings 51 of the hanging chain structure 5 further includes an elastic plate 5126 mounted in the receiving chamber 5124 of the stop member 512 and having a distal end 51260 extended into and locked in the limiting notch 5115 of the pivot seat 5113, and a spring 5125 mounted in the receiving chamber 5124 of the stop member 512 and having a first end urged on a wall of the receiving chamber 5124 of the stop member 512 and a second end urged on the elastic plate 5126.

Figure 2:
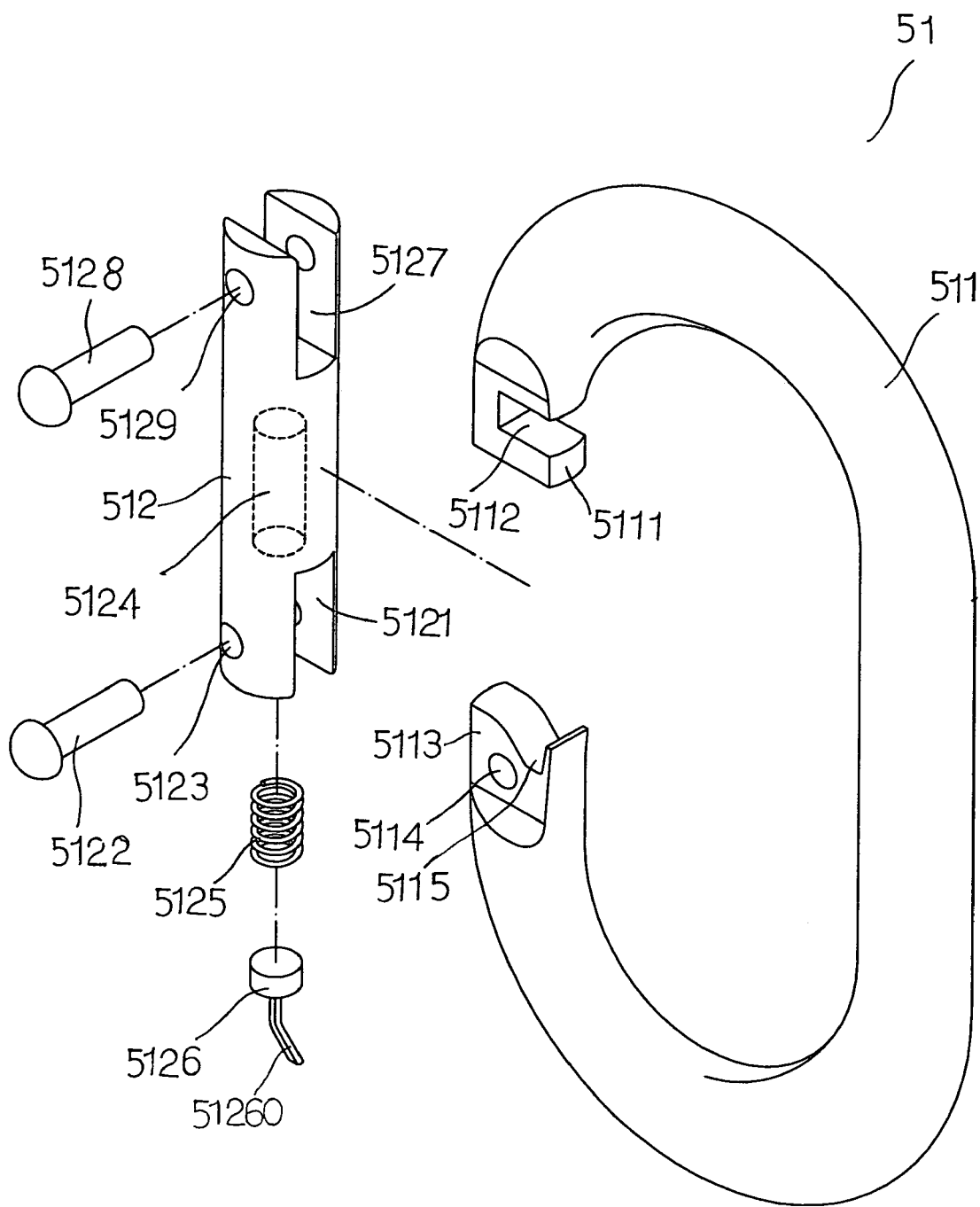
FIG. 2 is an exploded perspective view of the hanging chain structure in accordance with the preferred embodiment of the present invention.
Figure 5:
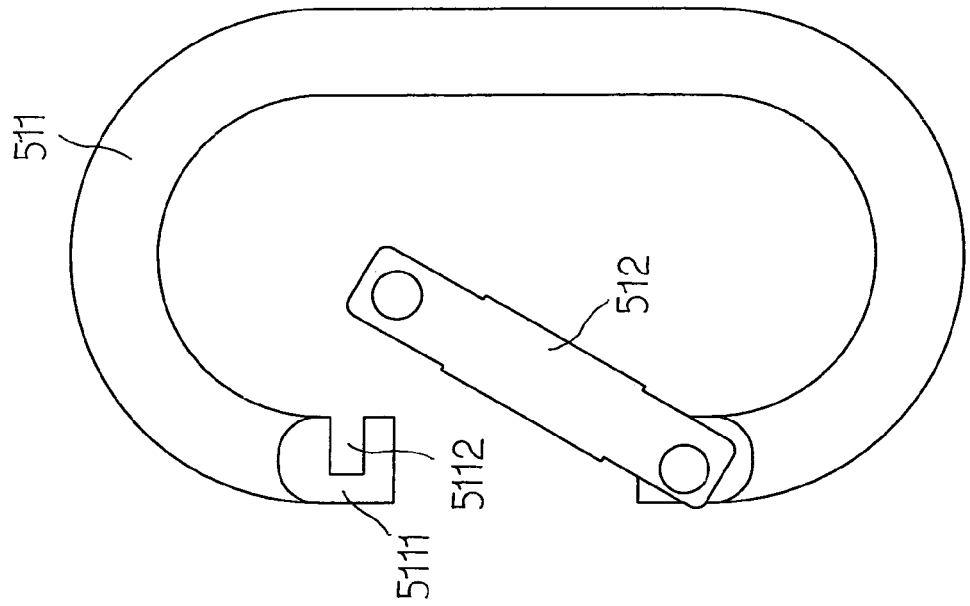
FIG. 5 is a schematic operational view of the hanging chain structure as shown in FIG. 3.
Figure 6:
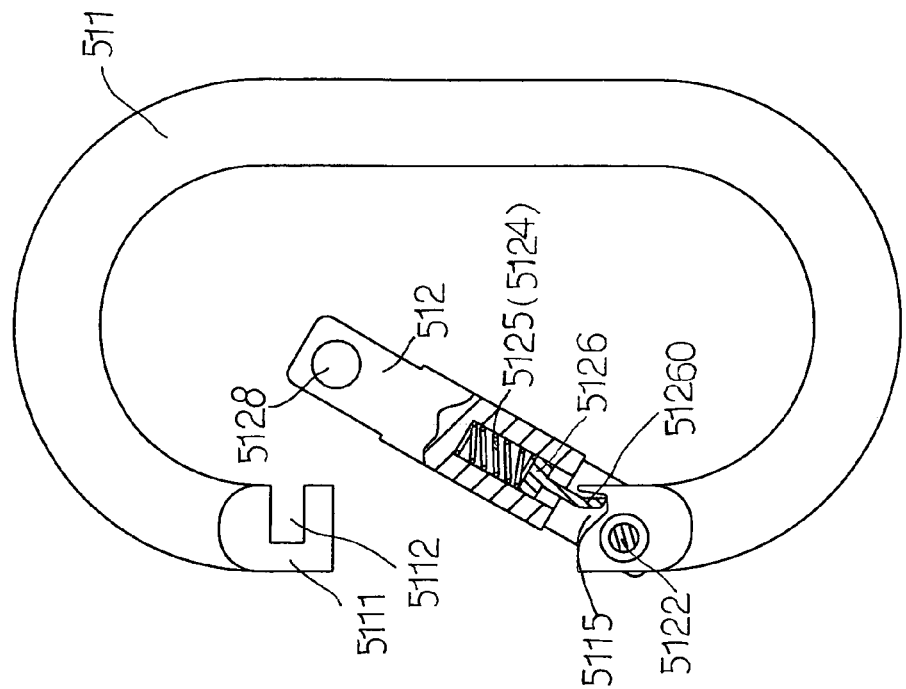
FIG. 6 is a schematic operational view of the hanging chain structure as shown in FIG. 4.

In operation, referring to FIGS. 3–6 with reference to FIGS. 1 and 2, when the stop member 512 is pressed toward the hook body 511, the first end of the stop member 512 is pivoted relative to the pivot seat 5113 of the hook body 511, so that the second end of the stop member 512 is moved toward the hook body 511 to detach the retaining pin 51260 from the locking recess 5112 of the locking block 5111 as shown in FIGS. 5 and 6, thereby forming a gap between the second end of the stop member 512 and the locking block 5111 of the hook body 511 to allow entrance of an article, such as the fixing hook 41 of the ceiling 4 and the fixing hook 61 of the pendent lamp 6.

Figure 3:
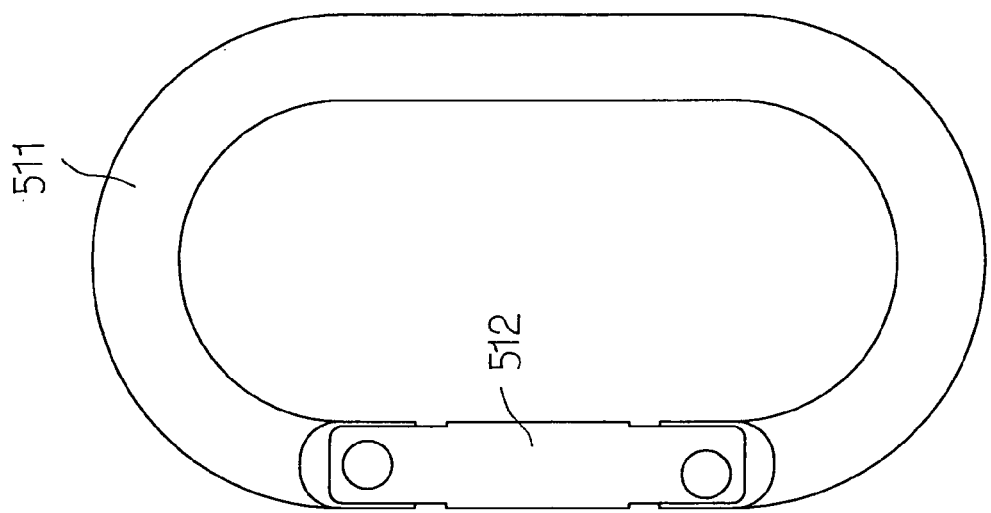
FIG. 3 is a plan assembly view of the hanging chain structure as shown in FIG. 2.
Figure 4:
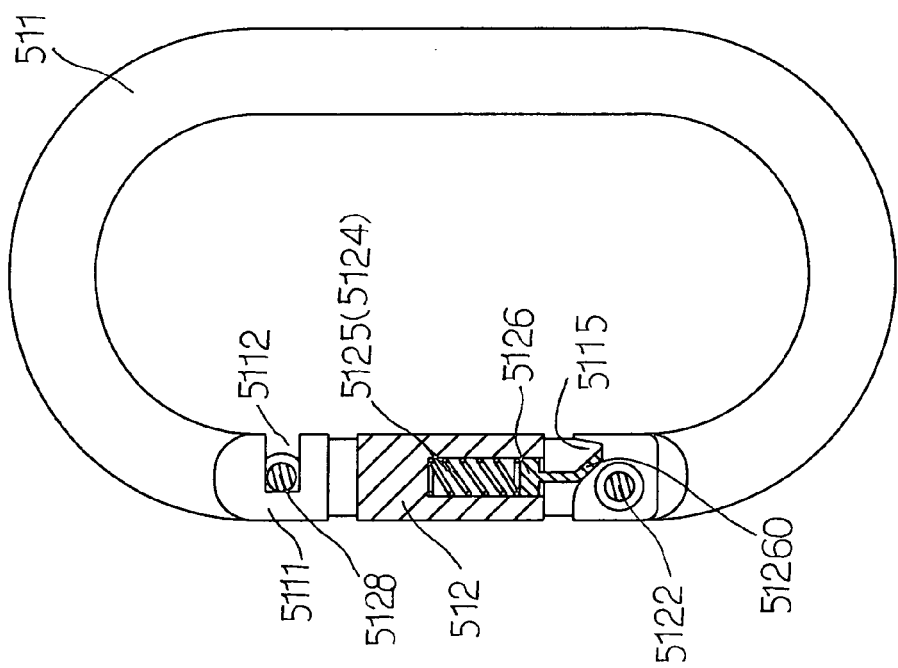
FIG. 4 is a partially plan cross-sectional assembly view of the hanging chain structure as shown in FIG. 2.
Figure 7:
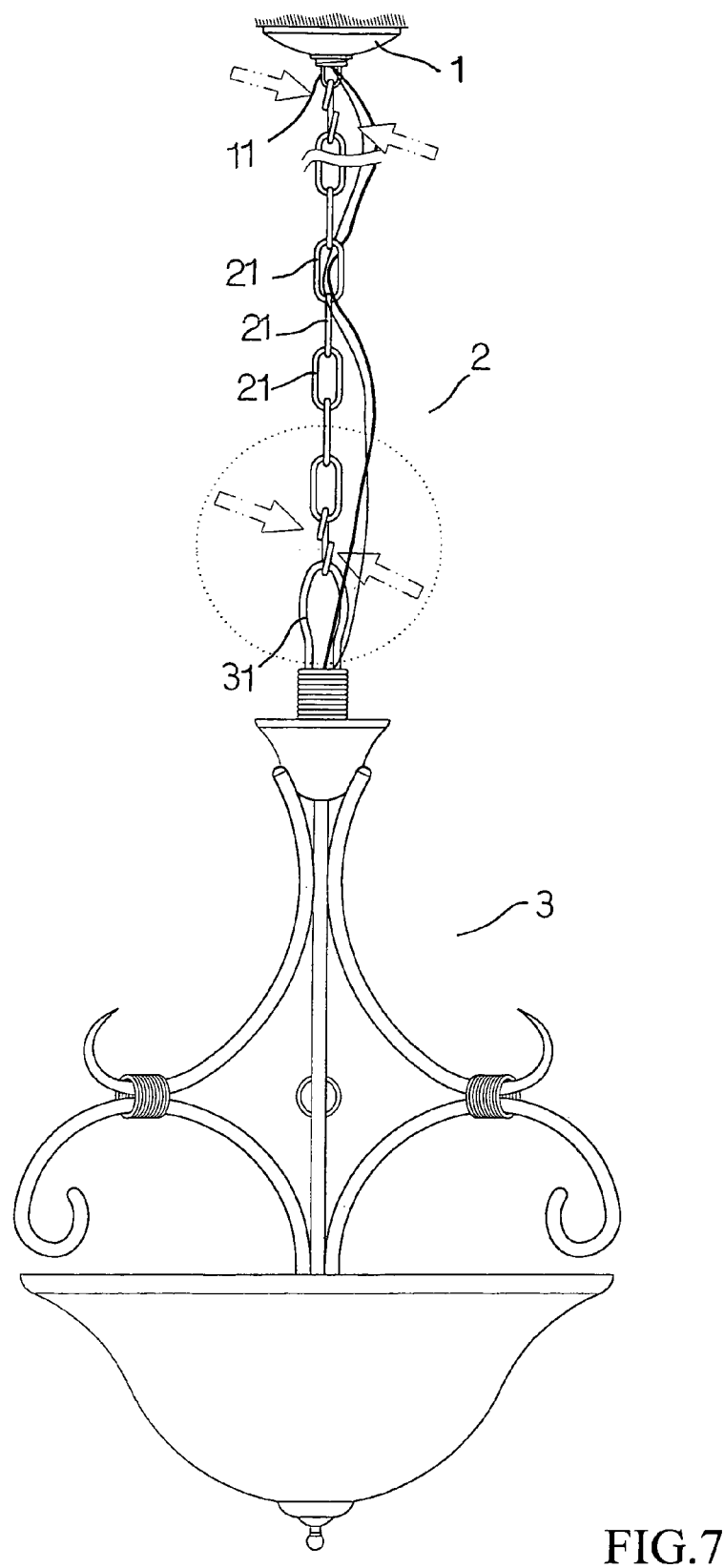
FIG. 7 is a plan view of a conventional hanging chain structure in accordance with the prior art.
Figure 8:
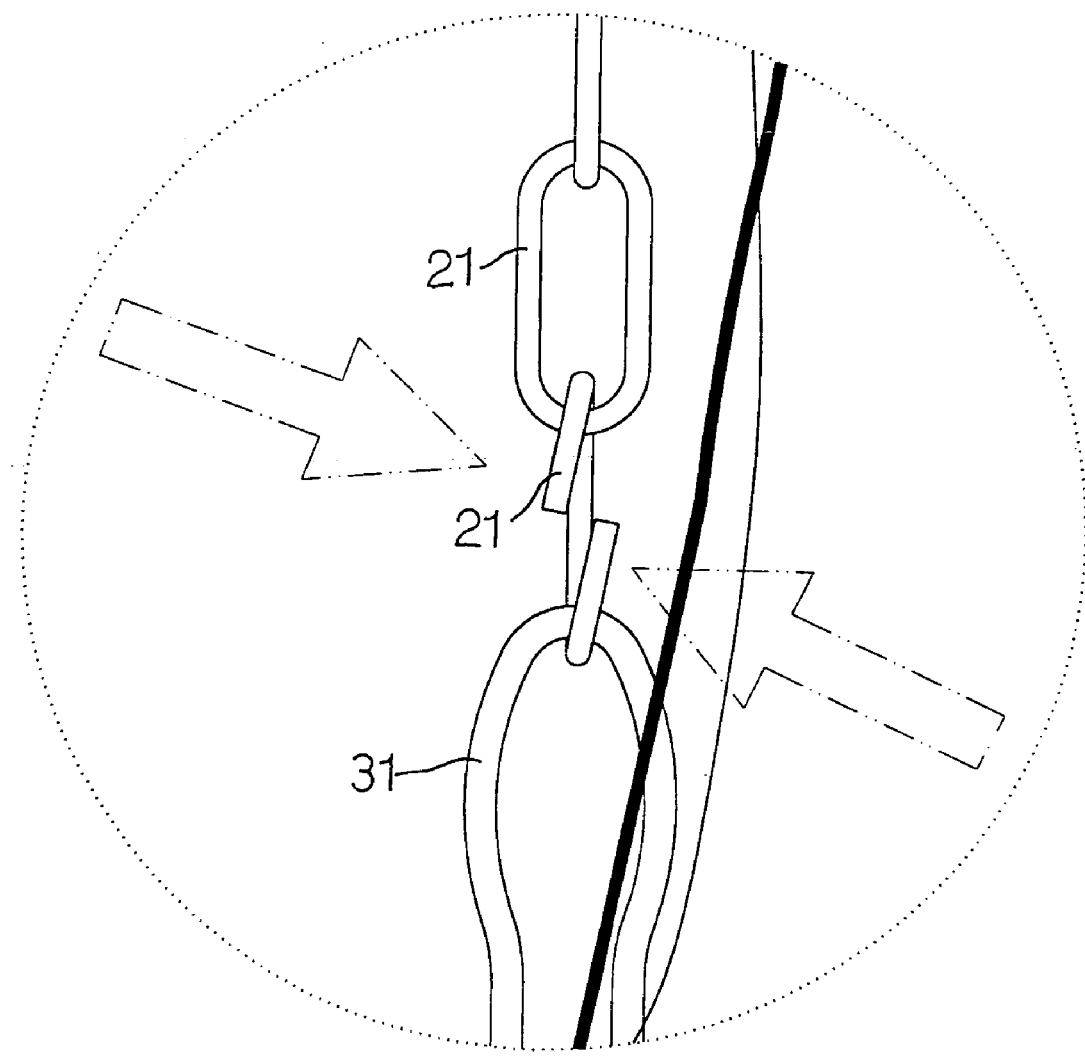
FIG. 8 is a partially enlarged view of the conventional hanging chain structure as shown in FIG. 7.

After the force applied on the stop member 512 is removed, the stop member 512 is pivoted relative to the pivot seat 5113 of the hook body 511 by the restoring force of the distal end 51260 of the elastic plate 5126 to return to the original position as shown in FIGS. 3 and 4, so that the retaining pin 51260 is inserted into and locked in the locking recess 5112 of the locking block 5111, thereby locking the stop member 512 on the hook body 511 to form a closed hanging ring 51.

In such a manner, the hook body 511 of a first hanging ring 51 is pressed on the stop member 512 of a second hanging ring 51 to pivot the stop member 512 of the second hanging ring 51 to form the gap, so that the hook body 511 of the first hanging ring 51 is inserted into and connected with the hook body 511 of the second hanging ring 51. Then, the stop member 512 of a second hanging ring 51 is returned to the original position by the restoring force of the elastic plate 5126, so that the hook bodies 511 of the hanging rings 51 are connected with each other.

Accordingly, the hanging rings 51 are connected with each other easily and rapidly, so that the hanging chain structure 5 is assembled easily and rapidly, thereby facilitating the operator mounting the hanging chain structure 5. In addition, the hanging chain structure 5 is combined with the pendent lamp 6 and the ceiling 4 easily and rapidly, thereby facilitating the operator mounting the pendent lamp 6 to the ceiling 4. Further, the retaining pin 51260 is locked in the locking recess 5112 of the locking block 5111 by the elastic force of the elastic plate 5126, thereby locking the stop member 512 on the hook body 511 to form a closed hanging ring 51, so that the hanging rings 51 are connected with each other rigidly and stably without detachment.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A hanging chain structure, comprising a plurality of hanging rings connected with each other, each of the hanging rings including a hook body, and a stop member pivotally mounted on the hook body, wherein:

the hook body of each of the hanging rings has a first end formed with a pivot seat and a second end formed with a locking block, the locking block of the hook body is formed with a locking recess;

the stop member of each of the hanging rings has a first end pivotally mounted on the pivot seat of the hook body and a second end provided with a retaining pin inserted into and locked in the locking recess of the locking block of the hook body;

the pivot seat of the hook body of each of the hanging rings has a periphery formed with a limiting notch;

the first end of the stop member of each of the hanging rings is formed with a receiving recess for receiving the pivot seat of the hook body;

the stop member of each of the hanging rings has an inside having a mediate portion formed with a cylindrical receiving chamber extended to and communicated with the receiving recess;

each of the hanging rings further includes a cylindrical elastic plate mounted in the receiving chamber of the stop member and having a distal end extended into and locked in the limiting notch of the pivot seat, and a spring mounted in the receiving chamber of the stop member and having a first end urged on a wall of the receiving chamber of the stop member and a second end urged on the elastic plate.

2. The hanging chain structure in accordance with claim 1, wherein the hook body of each of the hanging rings is substantially C-shaped.

3. The hanging chain structure in accordance with claim 1, wherein the stop member of each of the hanging rings is substantially rod-shaped.

4. The hanging chain structure in accordance with claim 1, wherein the pivot seat of the hook body is formed with a pivot hole, the first end of the stop member is formed with a passage hole aligning with the pivot hole of the pivot seat, and each of the hanging rings further includes a pivot pin extended through the passage hole of the stop member and the pivot hole of the pivot seat, so that the first end of the stop member is pivotally mounted on the pivot seat of the hook body.

5. The hanging chain structure in accordance with claim 1, wherein the second end of the stop member is formed with a passage hole for passage of the retaining pin.

6. The hanging chain structure in accordance with claim 1, wherein the locking block of the hook body has two opposite flattened faces, the second end of the stop member is formed with a receiving recess for receiving the locking block of the hook body when the retaining pin is inserted into the locking recess of the locking block, and the receiving recess of the second end of the stop member has two opposite flattened faces rested on the opposite flattened faces of the locking block of the hook body.

* * * * *